May 4, 1965 N. PRITIKIN 3,181,986

METHOD OF MAKING INLAID CIRCUITS

Filed March 31, 1961

INVENTOR.
NATHAN PRITIKIN

BY HIS ATTORNEYS.
HARRIS, KIECH, RUSSELL & KERN

United States Patent Office
3,181,986
Patented May 4, 1965

3,181,986
METHOD OF MAKING INLAID CIRCUITS

Nathan Pritikin, Santa Barbara, Calif., assignor to Intellux Inc., Santa Barbara, Calif., a corporation of California Filed Mar. 31, 1961, Ser. No. 99,880
13 Claims. (Cl. 156—233)

This invention relates to a new method for making inlaid circuits. Inlaid circuits comprise a special category in the general field of printed circuits. In an inlaid circuit, the electrically conducting material is flush with the supporting base to provide an uninterrupted surface, as for sliding contacts and the like. Inlaid circuits are particularly suitable for switching and commutating applications and there is considerable demand at the present time for reliable, durable and inexpensive inlaid circuit components.

Several methods have been tried in attempting to make suitable inlaid circuits. One is shown in the United States patent to Sabee et al., No. 2,447,541. In this method, the desired circuit configuration is formed as a raised portion of a stainless steel temporary base plate by etching away the undesired portions. A mask in the form of a resist material is then applied to the temporary base plate leaving the desired circuit configuration exposed. The circuit itself is then applied to the exposed portions of the temporary base by electroplating. Then a sheet of plastic material is pressed onto the plated surface of the base plate to imbed the plated circuit into the plastic sheet. Finally, the plastic sheet with the imbedded circuitry is separated from the temporary base plate with the resist coating thereon.

A number of problems have been encountered in practicing this process. The temporary base plate has a particular circuit etched therein and hence cannot be subsequently used for any other circuit configuration. This means that the expensive stainless steel base plate must be discarded after each job is completed. Also, the etching of the base plate produces undercutting along the edges of the raised portions of the circuit design. During electroplating, the electroplated circuit material tends to deposit over the undercut edges resulting in an uneven and loose edge for the circuit after the base plate is pulled away.

A similar method is shown in the United States patent to Decker, No. 1,963,834. In the process of this patent, the negative of the circuit is printed onto a metal plate and a resist material is applied onto the printed pattern. Subsequent steps include electroplating, application of a permanent insulating base, and separation of the metal plate. An image of the pattern is formed in the surface of the metal plate by the chemical and heat treatments which the exposed areas receive. Before the plate can be used for another circuit, this image must be polished away, an expensive and time-consuming operation which has made the process commercially unattractive.

A third method of making inlaid circuits which produces a precise flat surface is disclosed in the United States patent to Pritikin, No. 2,692,190. This process is presently in commercial use but is relatively expensive. In this process, a mask is applied to a temporary base plate and the circuit material is electroplated onto the base plate, with great care being taken to produce a good metallurgical bond between the circuit material and the base plate. Then the mask is dissolved away and a sheet of insulating material is pressed onto the base plate, covering the circuit material. In the final step, the temporary base plate is etched away using a solution which does not affect the circuit material. This process results in a perfectly smooth surface for the inlaid circuit as the electroplated circuit has been firmly bonded to the flat surface of the temporary base plate. However, this process is relatively expensive since the temporary base plate, ordinarily a copper sheet, is consumed.

Accordingly, it is an object of the present invention to provide a method of making an inlaid circuit having a precise flat surface, which method is relatively inexpensive. A further object is to provide such a method in which the circuit material is deposited against a flat temporary base. Another object is to provide such a method in which the temporary base is a multilayer structure with the major portion thereof being usable over and over again for the same circuit configuration and for different circuit configurations.

The method of the invention contemplates making an inlaid circuit by assembling a circuit carrier in the form of a relatively flexible metal film on a relatively rigid plate, applying electrically conducting material in a predetermined circuit pattern to the surface of the metal film of the carrier, applying a layer of insulating material against the circuit material and adjacent areas to provide a permanent base, separating the plate from the film, and stripping the film from the circuit material leaving the circuit material inlaid in the base. With this method, the plate may be used over and over again and the metal film can be retained for its salvage value. It is an object of the invention to provide such a method. A further object is to provide such a method including the steps of applying a mask in the negative of a predetermined circuit pattern to the surface of the metal film of the carrier, applying an electrically conducting material to the exposed portion of the film to produce a circuit, and removing the mask preparatory to applying the layer of insulating material.

It is a specific object of the invention to provide a method of making an inlaid circuit including treating the exposed surface of the film of the circuit carrier prior to application of the electrically conducting material so as to provide a poor bond between the conducting material and the metal film.

Other objects, advantages, features and results of the invention will more fully appear in the course of the following description. The drawing merely shows and the description merely described preferred embodiments of the present invention which are given by way of illustration or example.

Figure 1:
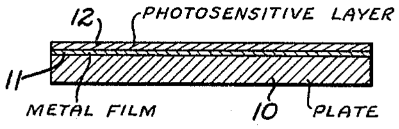
FIGS. 1 through 6 are sectional views illustrating steps in formation of an inlaid circuit according to the preferred embodiment of the invention.
Figure 2:
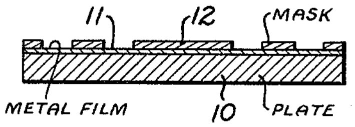
Figure 3:
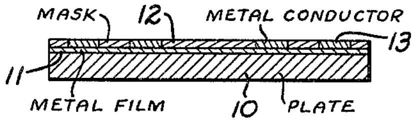

In making the inlaid circuit, a circuit carrier which serves as a temporary base is first produced. The circuit carrier comprises a relatively flexible metal film on a relatively rigid plate. Typically, the plate is a stainless steel sheet in the order of 1/16 to 1/8 inch thick. The metal film is typically a layer of copper or nickel in the order of .0001 to .0004 inch thick. The metal film may be adhered to the plate by contact pressure, pressure rolling, an adhesive, or the like. Alternatively, the metal film may be applied to the plate by electroplating. When the metal film is applied by electroplating, of necessity the rigid plate on the surface layer thereof must be an electrical conductor, but in general nonconductors such as plastics, ceramics, and wood may be used. When the film is produced by electroplating, care is taken to insure a poor or nonmetallurgical bond between the film and the base plate so that the plate is easily separated from the film. Specific methods for producing the poor bond will be described hereinbelow.

Electrically conducting material which will comprise the inlaid circuit is applied to the surface of the metal film of the circuit carrier in the desired pattern of the circuit. The electrically conducting material is preferably applied by electroplating, the most commonly used material being copper. Alternative methods of applying the conducting material include vapor deposition, application of molten metal by dipping or spraying, application of a metal paste mixture followed by firing in place, and reduction of a metal resinate paste.

In the preferred form of the invention, a mask which defines the inlaid circuit configuration is provided on the metal film prior to application of the electrically conducting material. This mask is then removed prior to application of the permanent base. In some cases, the mask would not be removed, but would join with the permanent base. Alternatively, the electrically conducting material may be applied through conventional silk screen masks, metal patterns and the like.

Prior to application of the eelctrically conducting material to the metal film, it is preferred to treat the metal film to provide a poor bonding surface for the conducting material. For example, the exposed surface of the metal film may be passivated in the conventional manner. Alternatively, a thin oxide coating may be formed on the surface of the metal film, as by heating the circuit carrier in an oxidizing atmosphere. As another alternative, a thin layer of a grease may be applied to the surface of the metal film. This treatment of the surface of the metal film does not prevent application of the electrically conducting material to the film and it is possible to use any of the methods of application described above when the surface is so treated. However, the bond formed between the conducting material and the metal film is quite poor and the two materials may be readily separated without damage to the conducting material.

Next, a suitable insulating material which is to form the permanent base of the inlaid circuit is applied against the conducting material carried on the circuit carrier. The insulating material should be in plastic form in order that it may be made to come into intimate contact with all exposed surfaces. Preferably, the material is a plastic such as Teflon or polystyrene but may be any thermoplastic or thermosetting synthetic or any hardenable insulating material suitable for the purpose. Where a thermosetting insulating material is employed for the permanent base, the sandwich structure may at this point be thermally set by application of elevated temperatures suitable for the particular thermosetting plastic utilized. Preferably, substantial pressure is also applied in order to insure firm and uniform contact between the plastic base material and the inlaid circuit material.

As the next step, the relatively rigid plate of the circuit carrier is separated from the permanent base and metal film. This is easily accomplished by inserting a knife-edge between the film and plate. Then the metal film is peeled away from the permanent base and circuit material, leaving the finished inlaid circuit with a precise smooth and flat surface flush with the permanent base.

Figure 6:
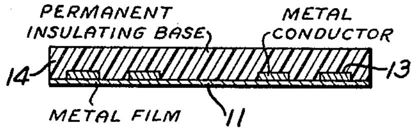
Figure 8:
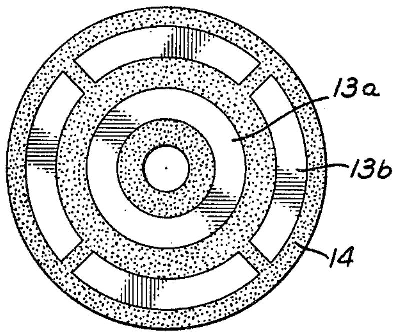
FIG. 8 is a plan view of the inlaid circuit of FIG. 7.
Figure 7:
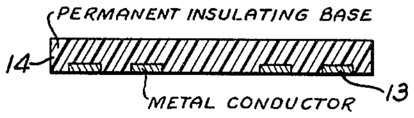
FIG. 7 is a sectional view of the completed inlaid circuit of FIGS. 1–6.

FIGS. 1 through 6 illustrate successive steps in manufacture of the inlaid circuit commutator of FIGS. 7 and 8. The circuit carrier comprises a relatively rigid stainless steel plate 10 with a layer of copper foil 11 adhered thereto. The mask for the inlaid circuit is applied by the conventional photoetching process which starts with application of a layer 12 of photosensitive material onto the film 11. See FIG. 1.

The photosensitive layer is exposed to radiation in a pattern which is the negative of the desired circuit pattern. The layer is then developed and fixed, with the unexposed portions of the layer being dissolved away leaving a mask which is the negative of the desired inlaid circuit. See FIG. 2.

Figure 4:
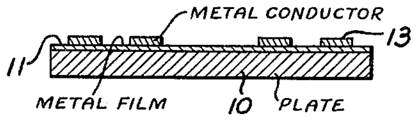
Figure 5:
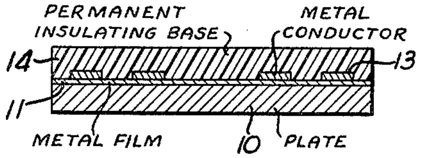

The exposed portion of the metal film 11 is now treated to provide a poor bonding surface, as by passivating. Alternatively, the film could be treated prior to application of the photosensitive layer. Then metal conductor 13 is applied by electroplating in the conventional manner. See FIG. 3. Following application of the metal conductor, the mask is removed by a solvent which is inactive with respect to the metal conductor, leaving the circuit carrier with the electrically conducting material applied thereto, as seen in FIG. 4.

The circuit is now ready for application of the permanent insulating base in the form of a sheet 14 of plastic material. See FIG. 5. After the permanent base has been fixed in place, the plate 10 is separated from the metal film 11 (FIG. 6). Then the metal film is peeled away from the base 14 to complete the manufacturing process. The particular inlaid circuit illustrated in the drawing comprises a commutator having an inner circular conductor 13*a* and a concentric outer segmented conductor 13*b*. Of course, much more complex shapes may be produced by the method of the invention, this simple form being used merely for illustration.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A method of making an inlaid circuit including the steps of:
   - assembling a circuit carrier in the form of a relatively flexible metal film adhered to a relatively rigid plate;
   - applying electrically conducting material in a predetermined circuit pattern upstanding from the surface of the metal film of the carrier;
   - applying a layer of insulating material against all exposed surfaces of the circuit material and adjacent areas of said metal film to provide a permanent base;
   - separating the plate from the film;
   - and stripping the film from the circuit material leaving the circuit material inlaid in the base.

2. A method of making an inlaid circuit including the steps of:
   - assembling a circuit carrier in the form of a relatively flexible metal film adhered to a relatively rigid plate;
   - applying a mask in the negative of a predetermined circuit pattern to the surface of the metal film of the carrier;
   - applying an electrically conducting material to the exposed portion of the film to produce a circuit upstanding from the metal film;
   - removing the mask;
   - applying a layer of insulating material against all exposed surfaces of the circuit material and the exposed metal film to provide a permanent base;
   - separating the plate from the film;
   - and stripping the film from the circuit material and base.

3. A method of making an inlaid circuit including the steps of:
   - assembling a circuit carrier in the form of a relatively flexible metal film adhered to a relatively rigid plate;
   - treating the exposed surface of the film to provide a poor bonding surface;
   - applying electrically conducting material in a predetermined circuit pattern upstanding from the surface of the metal film of the carrier;
   - applying a layer of insulating material against all exposed surfaces of the circuit material and adjacent areas of said metal film to provide a permanent base;
   - separating the plate from the film;
   - and stripping the film from the circuit material leaving the circuit material inlaid in the base.

4. A method as defined in claim 3 in which the poor bonding surface is produced by passivating the exposed surface.

5. A method as defined in claim 3 in which the poor bonding surface is produced by generating an oxide of the film metal on the exposed surface.

6. A method as defined in claim 3 in which the electrically conducting material is applied by electroplating.

7. A method of making an inlaid circuit including the steps of:

temporarily adhering a disposable metal foil to a metal plate to form a circuit carrier;

electroplating metal in a predetermined circuit pattern upstanding from the surface of the foil of the carrier;

applying a layer of insulating material against all exposed surfaces of the circuit metal and the exposed adjacent areas of the foil to provide a permanent base;

separating the plate from the foil;

and stripping the foil from the circuit metal and base leaving the metal inlaid in the base.

8. A method as defined in claim 7 in which the metal foil is adhered to the metal plate by pressure rolling a sheet of foil onto the plate.

9. A method as defined in claim 7 in which the metal foil is adhered to the metal plate by electroplating a layer of foil onto the plate.

10. A method of making an inlaid circuit including the steps of:

assembling a circuit carrier in the form of a relatively flexible metal film adhered to a relatively rigid plate;

applying a photosensitive coating to the exposed surface of the metal film;

exposing the photosensitive coating to a predetermined light pattern;

developing the exposed coating to leave a residue of coating on the metal film in the negative of a predetermined circuit pattern;

applying an electrically conducting material to the exposed portion of the film to produce a circuit upstanding from said film;

removing the residue;

applying a layer of insulating material against all exposed surfaces of the circuit material and the exposed adjacent areas of metal film to provide a permanent base;

separating the plate from the film;

and stripping the film from the circuit material and base.

11. A method of making an inlaid circuit including the steps of:

assembling a circuit carrier in the form of a relatively flexible metal film adhered to a relatively rigid plate;

applying a mask in the negative of a predetermined circuit pattern to the surface of the metal film of the carrier;

treating the exposed surface of the film to provide a poor bonding surface;

applying an electrically conducting material to the exposed portion of the film to produce a circuit upstanding from said film;

removing the mask;

applying a layer of insulating material against all exposed surfaces of the circuit material and the exposed adjacent areas of metal film to provide a permanent base;

separating the plate from the film;

and stripping the film from the circuit material and base.

12. A method of making an inlaid circuit including the steps of:

assembling a circuit carrier in the form of a relatively flexible metal film adhered to a relatively rigid plate;

applying a mask in the negative of a predetermined circuit pattern to the surface of the metal film of the carrier;

treating the exposed surface of the film to provide a poor bonding surface;

electroplating an upstanding electrical circuit onto the exposed portion of the film;

removing the mask;

applying a layer of insulating material against all exposed areas of the circuit material and the exposed adjacent areas of the metal film to provide a permanent base;

separating the plate from the film;

and stripping the film from the circuit material and base.

13. A method of making an inlaid circuit including the steps of:

releasably adhering a metal film in the order of a fraction of a thousandth of an inch in thickness to a relatively thick and rigid plate to form a circuit carrier;

applying electrically conducting material in a predetermined circuit pattern to stand upwardly from the surface of the metal film of the carrier;

applying a layer of insulating material against all exposed surfaces of the circuit material and adjacent areas of said film to provide a permanent base;

separating the plate from the film; and stripping the film from the circuit material leaving the circuit material inlaid in the base.

References Cited by the Examiner

UNITED STATES PATENTS

| | | | |
|---|---|---|---|
| 1,589,564 | 6/26 | Robinson | 204—281 |
| 2,226,382 | 12/40 | Norris | 204—281 |
| 2,551,591 | 5/51 | Foord. | |
| 2,745,898 | 5/56 | Hurd. | |
| 2,874,085 | 2/59 | Brietzke | 156—150 |

OTHER REFERENCES

IBM Technical Disclosure Bulletin, vol. 2, No. 1, June 1959.

EARL M. BERGERT, *Primary Examiner.*